Jan. 28, 1958    J. LAUTENBACHER ET AL    2,821,112
FOUR-MEMBERED PHOTOGRAPHIC WIDE-ANGLE OBJECTIVE
Filed March 5, 1956
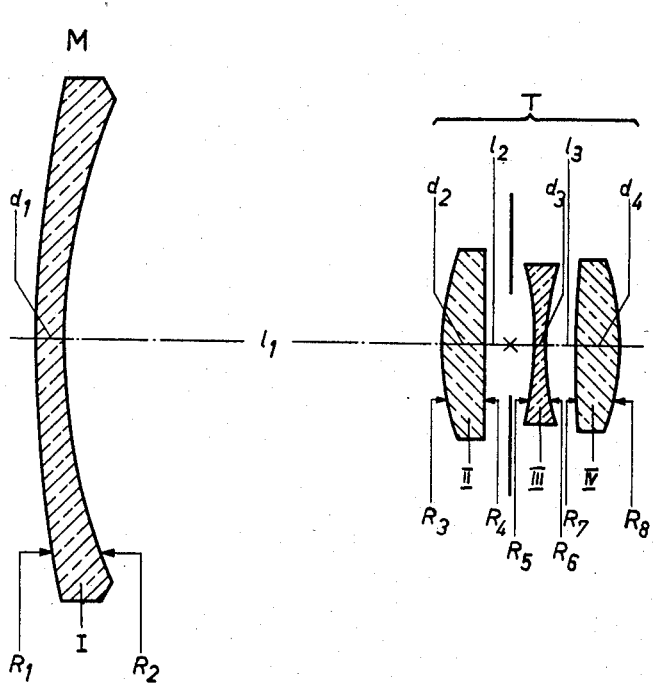
Inventors:
Johann Lautenbacher
Theodor Brendel
BY Richards & Geier
ATTORNEYS

United States Patent Office 2,821,112
Patented Jan. 28, 1958

2,821,112

FOUR-MEMBERED PHOTOGRAPHIC WIDE-ANGLE OBJECTIVE

Johann Lautenbacher and Theodor Brendel, Munich, Germany, assignors to Enna-Werk Optische Anstalt Dr. Appelt K. G., Munich, Germany, a corporation of Germany Application March 5, 1956, Serial No. 569,500

2 Claims. (Cl. 88—57)

This invention relates to a four-membered photographic wide-angle objective, and refers more particularly to an objective of this type which consists of a simple triplet and a negative meniscus located in front of the triplet and having a concave surface which is directed toward the triplet, the meniscus and the triplet being separated by an air gap, the length of which is substantially greater than the over-all length of the triplet.

In prior art objectives of this type were used in single reflex cameras due to their long back focal length, and they were corrected for a relative aperture up to $f:4.0$.

An object of the present invention is to improve objectives of this type.

Another object of the present invention is the provision of a wide-angle objective of the described type wherein the relative aperture is enlarged to $f:3.5$.

Yet another object is to improve simultaneously the comatic corrections of such objectives even for a large wave-length range to such an extent that the diameters for oblique rays may be substantially widened in order to reduce the so-called vignetting.

Other objects of the present invention will become apparent in the course of the following specification.

The objects of the present invention may be realized by a specific design of an objective, the construction data of which, namely the radii $r_1$ to $r_8$, the axial thicknesses $d_1$ to $d_4$, the air gaps or air spaces $l_1$ to $l_3$, the refractive indices $n_1$ to $n_4$ and the Abbe $v$-values $v_1$ to $v_4$ are located within the following ranges:

| Radii | Thicknesses Air Spaces | Refractive Indices | V-Values |
|---|---|---|---|
| $1.5f<r_1<2.5f$ | $0.01f<d_1<0.2f$ | $1.44<n_1<1.60$ | $45<v_1<75$ |
| $0.8f<r_2<1.2f$ | $0.70f<l_1<1.0f$ | | |
| $0.4f<r_3<0.55f$ | $0.05f<d_2<0.2f$ | $1.65<n_2<1.80$ | $35<v_2<55$ |
| $r_4=\infty$ | $0.05f<l_2<0.2f$ | | |
| $0.45f<r_5<0.6f$ | $0.003f<d_3<0.1f$ | $1.62<n_3<1.75$ | $27<v_3<37$ |
| $0.45f<r_6<0.55f$ | $0.03f<l_3<0.1f$ | | |
| $2f<r_7<4f$ | $0.05f<d_4<0.2f$ | $1.60<n_4<1.75$ | $50<v_4<65$ |
| $0.35f<r_8<0.5f$ | | | |

The invention will appear more clearly from the following detailed description when taken in connection with the accompanying drawing, the single figure of which shows, by way of example, an objective constructed in accordance with the present invention.

The drawing figure illustrates a negative meniscus M and a simple triplet T. All the data of this construction lie within the above stated range. The objective has a focal length of $f=1.0$ and the back focal length is $s'=1.01941$.

In the following example and in the drawing, the radii are designated as $r$, the axial thicknesses are designated as $d$, the air gap spaces as $l$, the refractive indices for the yellow helium line of the spectrum (587.6 m$\mu$) as $n$, and the Abbe-numbers as $v$:

| | | | |
|---|---|---|---|
| $r_1=+1.98400$ | $d_1=0.050$ | $n_1=1.51821$ | $v_1=65.2$ |
| $r_2=+0.95718$ | $l_1=0.760$ | | |
| $r_3=+0.46000$ | $d_2=0.090$ | $n_2=1.74400$ | $v_2=44.9$ |
| $r_4=\infty$ | $l_2=0.100$ | | |
| $r_5=-0.53800$ | $d_3=0.028$ | $n_3=1.67270$ | $v_3=32.2$ |
| $r_6=+0.49400$ | $l_3=0.060$ | | |
| $r_7=+2.6000$ | $d_4=0.094$ | $n_4=1.65160$ | $v_4=58.5$ |
| $r_8=-0.42816$ | | | |

It is apparent that the above example has been given by way of illustration only, and that it is subject to variations and modifications within the scope of the present invention.

What is claimed is:

1. A photographic wide-angle objective consisting of four members which consist of a simple triplet and a negative meniscus located in front of the triplet and having a concave surface which is directed toward the triplet, having the following characteristic data, in relation to the radii $r_1$ to $r_8$ of the members with reference to the focal length $f$, $$1.5\ f<r_1<2.5\ f$$
$$0.8\ f<r_2<1.2\ f$$
$$0.4\ f<r_3<0.55\ f$$
$$r_4=\infty$$
$$0.45\ f<r_5<0.6\ f$$
$$0.45\ f<r_6<0.55\ f$$
$$2\ f<r_7<4\ f$$
$$0.35\ f<r_8<0.5\ f$$

in relation to the thicknesses $d_1$ to $d_4$ of the members, the air gaps $l_1$ to $l_3$ between the members with reference to the focal length $f$, $$0.01\ f<d_1<0.2\ f$$
$$0.7\ f<l_1<1.0\ f$$
$$0.05\ f<d_2<0.2\ f$$
$$0.05\ f<l_2<0.2\ f$$
$$0.003\ f<d_3<0.1\ f$$
$$0.03\ f<l_3<0.1\ f$$
$$0.05\ f<d_4<0.2\ f$$

in relation to the refractive indices $n_1$ to $n_4$ of the members, $$1.44<n_1<1.60$$
$$1.65<n_2<1.80$$
$$1.62<n_3<1.75$$
$$1.60<n_4<1.75$$

and in relation to the Abbe-numbers $v_1$ to $v_4$ of the members, $$45<v_1<75$$
$$35<v_2<55$$
$$27<v_3<37$$
$$50<v_4<65$$

2. An objective in accordance with claim 1, having the following constructional data,

| | | | |
|---|---|---|---|
| $r_1 = +1.98400$ | $d_1 = 0.050$ | $n_1 = 1.51821$ | $v_1 = 65.2$ |
| $r_2 = +0.95718$ | $l_1 = 0.760$ | | |
| $r_3 = +0.4600$ | $d_2 = 0.090$ | $n_2 = 1.74400$ | $v_2 = 44.9$ |
| $r_4 = \infty$ | $l_2 = 0.100$ | | |
| $r_5 = -0.53800$ | $d_3 = 0.028$ | $n_3 = 1.67270$ | $v_3 = 32.2$ |
| $r_6 = +0.49400$ | $l_3 = 0.060$ | | |
| $r_7 = +2.60000$ | $d_4 = 0.094$ | $n_4 = 1.65160$ | $v_4 = 58.5$ |
| $r_8 = -0.42816$ | | | |

References Cited in the file of this patent
UNITED STATES PATENTS

| | | |
|---|---|---|
| 2,126,126 | Merte | Aug. 9, 1938 |
| 2,649,022 | Angenieux | Aug. 18, 1953 |
| 2,725,789 | Schlegel | Dec. 6, 1955 |

FOREIGN PATENTS

| | | |
|---|---|---|
| 724,698 | Great Britain | Feb. 23, 1955 |